Figure 1:
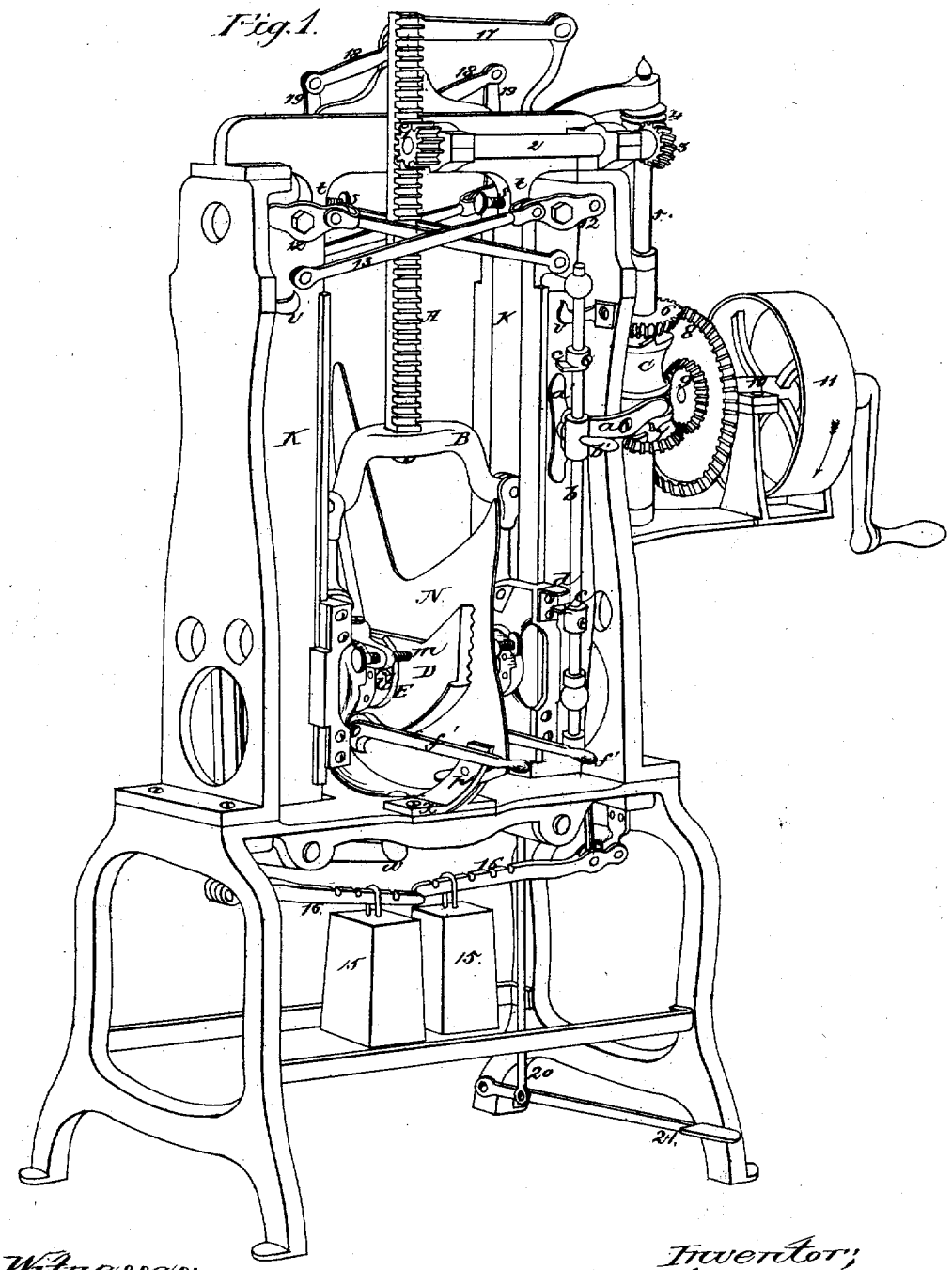

2 Sheets--Sheet 1.

S. W. JAMISON.

Crimping-Machine.

No. 6,526. Reissued June 29, 1875.

Witnesses;
N. Bailey
Wm. H. McCabe

Inventor;
Sam'l W. Jamison
by his attorney
A. Pollok

N. PETERS, PHOTO-LITHOGRAPHER, WASHINGTON, D. C.

S. W. JAMISON.
Crimping-Machine.
No. 6,526. Reissued June 29, 1875.
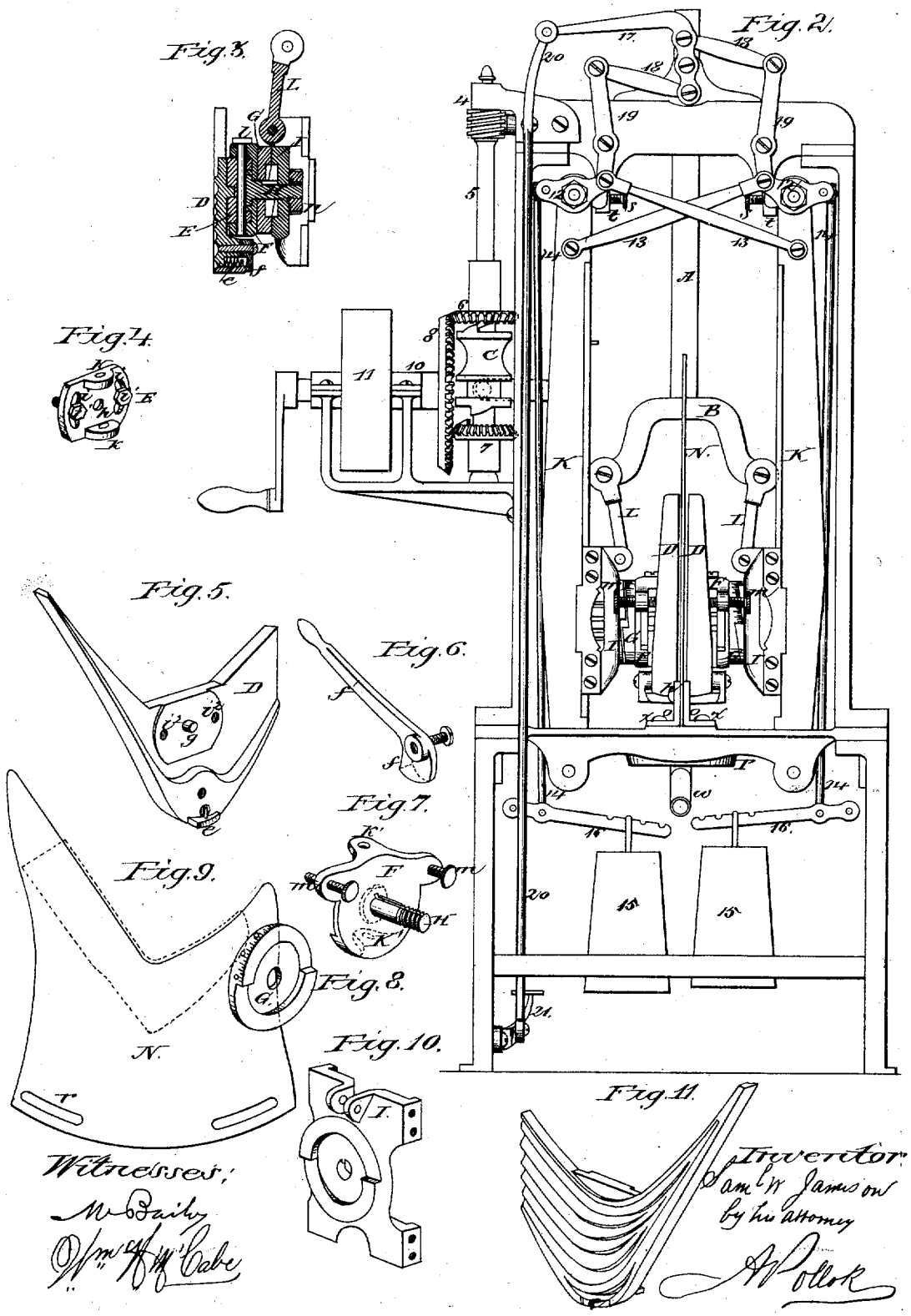
N. PETERS, PHOTO-LITHOGRAPHER, WASHINGTON, D. C.

UNITED STATES PATENT OFFICE.

SAMUEL W. JAMISON, OF NEWARK, N. J., ASSIGNOR TO THE S. W. JAMISON BOOT AND SHOE CRIMPING MACHINE COMPANY, OF NEW YORK CITY.

IMPROVEMENT IN CRIMPING-MACHINES.

Specification forming part of Letters Patent No. 99,906, dated February 15, 1870; reissue No. 6,526, dated June 29, 1875; application filed June 18, 1875.

*To all whom it may concern:*

Be it known that I, SAMUEL W. JAMISON, of Newark, Essex county, New Jersey, have invented certain new and useful Improvements in Machines for Crimping Leather for Boots and Shoes; and I hereby declare the following to be a full, clear, and exact description of the same, reference being had to the accompanying drawings.

My invention, in its more prominent aspects, has been designed with reference to that class of crimping-machines in which the material is crimped by passing between jaws which exercise upon the material a pressure induced by means of a weight or weights—as shown, for instance, in the machine for which Letters Patent No. 64,538 were granted to me on the 7th day of May, 1867.

The machine in which my present invention is illustrated possesses the general features which characterize the patented machine—that is to say, it has a stationary crimping-form, combined with movable jaws supported by brackets attached to a vertically-moving cross-head, and sliding in laterally self-adjusting ways—but it also embodies greatly-improved features, which give it a practical value far exceeding the old machine, and which, in many respects, admit of it being employed to more advantage.

My improvements relate, first, to the gearing for communicating motion to the crimping-plates; second, to the construction and arrangement of the crimping plates or jaws, and their combination with the brackets which support them; third, to the arrangement of the crimping form or tree and its combination with the movable jaws; fourth, to improved mechanism for inducing the pressure of the jaws upon the material to be crimped, and for removing said pressure, in whole or in part, when desired; fifth, to other features which will be hereinafter specified.

The nature of my invention, and the manner in which the same is or may be carried into effect, will be readily understood by reference to the accompanying drawing, in which—

Figure 1 is a perspective view, and Fig. 2 is a rear elevation, of a machine made in accordance with my invention. The remaining figures represent views of detached parts, which will be referred to in the course of this specification.

I. *The gearing for imparting up-and-down movement to the jaws.*—The object of this portion of my invention is to provide a means whereby, when the jaws have moved the proper distance up or down, they may be automatically thrown out of gear and their motion arrested, the trip and clutch by which this result is attained being so arranged that, although the main or driving wheel revolves continually in one direction, the movement of the jaws may be either reversed or entirely arrested by the shifting of the clutch. My further object is to so combine the clutch with the gears for moving the jaws up and down that the jaws shall move upward at a greater rate of speed than that at which they move downward toward or upon the leather to be crimped.

To attain these objects I proceed as follows: The rack A of the cross-head B is fitted in a recess in the frame of the machine, as described in my former patent, and engages with a pinion, 1, on horizontal shaft 2, mounted in bearings on the top of the frame. On the other end of the shaft is a wheel, 3, with oblique teeth, which engages with the worm 4 on the upright shaft 5, which is supported in suitable bearings by the side of the machine. On this shaft two bevel-gears are loosely mounted, the upper gear 6 engaging with the large bevel-toothed wheel 8 on the horizontal shaft 10, which carries the pulley 11, which receives motion from the prime mover; and the lower gear 7, engaging with the pinion 9, mounted also on shaft 10.

Between the two gears 6 and 7 is the clutch C, which is fitted upon the shaft, and is so held to it by a spline or equivalent device that while it will communicate a rotary movement to, it is also free to slide up and down on, the shaft. The size of the clutch is so proportioned to the distance between the two gears 6 and 7 that the clutch may be either held out of contact with both of the gears, in which case the shaft 5 would have no motion, or be thrown into connection with either gear, according to the direction in which the shaft 5 is desired to revolve, the usual teeth being formed on the ends of the clutch and the contiguous faces of the gears to admit of this connection, as shown in the drawing. Under the arrangement described, when the clutch is out of connection with both gears, as seen in Fig. 1, the gears 6 and 7, supposing the pulley to be moving in the direction of the arrow, will revolve loosely upon the shaft 5, and no movement will be communicated to the cross-head. But if, now, the clutch be thrown into connection with the upper gear the shaft will revolve, causing the cross-head, through the intermediate gears 1 3 4 and rack A, to rise in the frame. If, on the contrary, the clutch be thrown into connection with the lower gear 7 the shaft will be caused to revolve in the opposite direction, and the cross-head, instead of ascending, will descend. Thus, by this combination of the two gears 6 7, which I call reversing-gears, with the clutch and cross-head, the movement of the latter can be instantaneously reversed or entirely arrested, as desired. As the wheel 8, which actuates the upper gear 6, is of much greater diameter than the pinion 9, which actuates the lower gear 7, the upper gear will revolve at a proportionately greater rate of speed than the lower, so that the cross-head will rise much more rapidly than it descends, while, on the other hand, although the cross-head or the jaws which it carries have a decreased speed during their descent, they have increased power, thus meeting the conditions required for their use; for while they may move rapidly upward after the crimping has been effected, they must, in descending upon the leather, move slowly, but with power, in order to crimp perfectly and at the same time without injury to the material. In order to render the action of the clutch to some extent automatic, I combine with it a lever, *a*, pivoted to the frame of the machine, and carrying on one end a pin or roller stud, which fits in an annular groove in the clutch. The other arm of the lever fits in a slot or suitable recess provided for it on the sliding trip-rod *b*, which is capable of moving up and down in bearings attached to the frame of the machine. The rod carries two tripping-fingers, *c c*, located in such relation to a corresponding tripping-finger, *d*, on the cross-head, or other part moving in unison therewith, that when the cross-head in its ascent is raised sufficently above the crimping-form to permit the crimped front to be removed, and another piece of goods to be put on the tree, the finger *d* will come in contact with the upper finger *c*, and raise the rod *b*. This movement of the rod will actuate the lever to depress the clutch so as to throw it out of connection with the upper gear 6, but not so as to throw it into connection with the lower gear 7, so that the movement of the cross-head is arrested until it is again required to descend, when, by lifting the rod *b*, by means of the handle *b'*, which it carries, the clutch will be depressed until it is thrown into connection with the lower gear 7. The cross-head will now descend, continuing to move until the finger *d* presses upon the lower finger *c*, so as to depress the tripping-rod and throw the clutch out of connection with the lower gear. The movement of the cross-head then ceases, and it remains at rest until the rod *b*, by means of its handle, is depressed sufficiently far to throw the clutch in connection with the upper gear, when the cross-head will recommence its ascent.

The tripping-rod is maintained in whatever position it may happen to be by means of a spring, *a'*, or other friction device applied between the lever *a* and frame, as shown in the drawing, or in any other suitable manner.

II. *Crimping-jaws and stationary tree or form.* The object I have in view in this part of my invention is to render the jaws adjustable, first, to conform to the position of the crimping form; second, to adapt themselves to inequalities in the leather; third, to admit of their being moved bodily away from or toward each other, according to the thickness of the material to be crimped. My further object is to so arrange the crimping-former that it may be adjusted to crimp at varying angles to the heel, as hereinafter explained.

The crimping jaws or plates are shown at D D. The one jaw and the mechanism connected with the same are the counterparts of the other jaw and its operative mechanism, so that a description of one will answer for both. The form of the jaw is shown in Fig. 11, representing a front view, and Fig. 5, representing a rear view. The face of the jaw is corrugated in any ordinary or suitable manner, and, if desired, there is provided at the lower part or heel of the jaw a sliding clamp, *e*, which is held back by a spring, so as to be about flush with the face of the jaw, as shown in cross-section in Fig. 3. This clamp can be projected from the face of the jaw, so as to take the required hold upon the leather, by means of the cam *f* and lever-handle *f'*, the cam being pivoted to the rear side of the jaw, in such position that when rotated by means of its handle it may strike against the projecting and beveled rear end of the clamp, which will thus be forced outward, the spring offering only a yielding resistance. Upon the rear side of the crimping plate or jaw is a pin or stud, *g*, which constitutes the pivot upon which the jaw can be turned, so as to set it at varying angles corresponding with the tilt or inclination of the stationary crimping-form. The pin fits in a socket, *h*, formed in a plate, E, Fig. 4. The latter is provided on each side of the socket with a slot, *i*, curved in the arc of a circle, of which the socket is the center. Through each slot passes a clamping-screw, $i^1$, which enters a screw-threaded hole, $i^2$, formed for it in the jaw.

In order to set the jaw at the proper angle, the clamping-screws $i^1$ are loosened. The jaw is then turned to the proper inclination, and the screws are then again tightened, so as to hold the jaw tightly and immovably to the plate.

Having thus provided for the tilting in the plane of the jaws, it becomes necessary to provide a means for allowing the jaws to conform to inequalities in the thickness of the leather, or for causing them to act more powerfully upon any desired portion of the material. To this end the plate E is provided on its rear side with two sockets, *k*, one at the top the other at the bottom, and upon the face of the plate F, Fig. 7, are formed two ears, *k'*, correspondingly located, and provided with sockets. The two plates are placed together, so that the four sockets will be in line, and then through the sockets is passed a spindle or rod, *l*, Fig. 3, which holds the two plates together, and allows at the same time a limited lateral oscillation of the plate E, and consequently of the jaw attached to the plate. The jaw therefore is capable of movement upon the two axes *g* and *l*, so that it can readily conform to the position of the tree and the inequalities of the leather.

In order to limit the lateral vibration of the jaw the plate F is provided with two set-screws, *m*, one on each side, the ends of which bear against the jaw, as seen in Figs. 1 and 2. By adjusting these screws the jaw can be held more or less in contact with any part of the leather, as desired. When the crimping is to take place at one point without straining other portions of the material, the screw nearest that point is set up, while the other is retracted, thus allowing the jaw to recede on one side, but holding it in close contact with the leather on the other.

In order to set the jaws close together, whenever desired, I combine with each jaw a disk, G, Fig. 8, which fits upon a spindle, H, whose head is held in the plate F. The rear side of this disk is formed so as to constitute a double-inclined or double-helical cam. The spindle passes through a socket in the bracket I, Fig. 10, which bracket has formed upon its face a double-helical cam, the counterpart of that upon the cam-disk G. These two cam-surfaces fit together, and a nut, *n*, Fig. 3, on the end of the spindle serves to draw the disk and bracket tightly together, the spindle being prevented from rotating, while the nut is screwed up, by means of a spline in the socket in the bracket I, which fits in a groove in the spindle. When the nut is loosened the cam-disk can be turned by suitable means so as to set the one jaw as close to the other as desired, after which, by tightening the nut, all the parts will be drawn together tightly and securely. A scale upon the periphery of the disk (see Fig. 8) serves to indicate to what extent the cam should be rotated for different thicknesses of leather. The bracket slides in the ways K, and is connected with the cross-head B by means of a rod or arm, L, hinged both to the cross-head and to the bracket. The stationary crimping plate or form is shown at N, Figs. 1, 2, and 9. It is of any ordinary or suitable shape, and it only differs from ordinary forms in that it is made adjustable or capable of being tilted endwise, so as to elevate the toe more or less, according to the different shapes of leather or uppers to be crimped—as, for instance, in order to crimp the upper of a gaiter-boot the toe must be elevated much more than is required to crimp a "tongue-boot," and a tongue-boot requires a greater elevation of the toe of the form than is required to crimp the upper of an ordinary boot.

To meet these requirements I, as above stated, make the form adjustable, or so that it may be tilted endwise. This result may be attained in various ways, but I find it preferable to support the lower part of the form at each end between two plates, *o*, provided with a set or holding screw, *p*, which passes through a curved slot, *r*, in the form, so that, by loosening the screws, the form may be rocked or tilted endwise, to cause a greater or less elevation of the toe.

The curve of these slots follows a circle, of which the horizontal axis *g* of the jaws is the center, when the heel or lower part of the jaws has about reached the corresponding depression in the stationary form, so that after the form has been adjusted in the desired position the jaws may be correspondingly adjusted with ease and certainty.

III. *The mechanism for inducing pressure and for lightening the same when required.*—The ways K are hinged to their lower ends to the frame of the machine, and connected together and operated by a system of rods and levers, 12 13 14, substantially in the manner described in my former patent above specified, and need, therefore, no further description.

Instead, however, of hanging the weights 15 directly from the ends of the rods 14, as described in that patent, I now hinge the ends of the rods 14 to levers 16, the ends of which are pivoted or jointed to the frame of the machine, and upon the other ends of these levers are hung the weights 15. The ends of the levers are notched, so that the weights may be set a greater or less distance from the points where the rods 14 are hinged, according to the nature of the work or the degree of pressure required upon the leather. Under the old plan of hanging the weights directly from the ends of the rods 14 it was necessary to change the weights every time a different degree of pressure was required; but under the present arrangement a single weight for each lever will suffice, which can be set farther from or nearer to the fulcrum, according to the pressure required.

It is necessary at times to spread apart the ways, so as to separate the jaws; for instance, when the cross-head is ascending, and there is no occasion for the jaws to be in close proximity. To this end, I provide at the upper part of the machine a system of levers, 17 18 19, whose arrangement is clearly shown in Fig. 2. The lower ends or arms of the levers 19 bear against the inner faces of the ways K, and the longer arm of the elbow-lever 17 is hinged to the connecting-rod 20, which extends down toward the bottom of the machine, and is hinged to a treadle, 21, as seen in Fig. 1. By pressing on the treadle the lower ends of the levers 19 are forced outward, thus spreading the ways apart. The arrangement of these levers can of course be varied to a considerable extent, though the arrangement shown is simple and well adapted for the purpose.

IV. *Adjustment of the ways.*—As the extent to which the ways may approach each other varies in accordance with the nature of the work, it is desirable to provide a means of adjustment whereby the extent of the movement of the ways toward each other may be determined and limited. To this end I provide set-screws *s* at the upper part of the machine, passing through ears or bearings *t*, so that their points shall bear against the upper ends of the ways. By turning these screws in or out the extent which the ways may move toward each other can be regulated and limited with great ease and accuracy.

To assist in this adjustment of the ways pointers or gages *v* are placed on the frame of the machine, so as to extend upon or opposite the sides of the ways. By means of these gages the parallelism of the ways may be determined, or the required adjustment of the set-screws for different kinds of work may be indicated, suitable scales being formed on the side of ways opposite or in line with the pointers.

V. *Adjustment of the supports or brackets by which the crimping form or tree is held.*—These brackets *o* have been hereinbefore mentioned. They are held to the bottom of the frame by set-screws *x*, which pass through the slots in the brackets, and are screwed into the frame. Under this arrangement of the brackets the lateral adjustment of the crimping-tree is readily effected.

Another advantage is that the form may be made self-adjusting during the operation of crimping. It sometimes happens that the portion of leather on one side of the form is thicker than that on the other. If, therefore, the form were immovable during the crimping operation, the leather would, under ordinary circumstances, be pressed much more forcibly on the one side than on the other; but by slightly loosening the set-screws *x* this defect will be avoided, for, as the jaws descend, if there be any inequalities in the leather, as specified, the brackets *o* will move laterally in one direction or the other to compensate for the inequalities in the leather, rendering the form self-adjusting, and causing the pressure to be equalized and evenly distributed upon both sides of the form.

VI. *The dripping-pan and discharge-tube.*—In the bottom of the machine, immediately under the crimping-form, is formed a pan, P, which is for the purpose of catching the drippings pressed from the leather during the crimping operation. From this pan there extends to the rear of the machine a tube or conduit, *w*, through which the drippings pass, and from which they are discharged into any suitable receptacle, thus preventing any accumulation of liquid in the pan.

In conclusion, I would say that, while I have here specified the particular means I prefer to employ in order to carry my invention into effect, yet the construction and arrangement of the parts may be variously modified without departure from the principle of my invention. I do not, therefore, limit myself to the precise details herein described; but

What I claim, and desire to secure by Letters Patent, is—

1. In a crimping-machine, crimping-jaws whose pressure upon the material to be crimped is induced by a system of levers, adjustably weighted, as described, to regulate the degree of pressure exercised by the jaws, substantially as set forth.

2. The combination of the following elements—namely, crimping-jaws, levers adjustably weighted to regulate the degree of pressure exercised by the jaws, and a treadle mechanism—whereby this pressure may be relieved in whole or in part, substantially as herein shown and set forth.

3. In a crimping-machine, the combination of a system of levers, adjustably weighted to regulate the degree of pressure, and crimping-jaws, adjustable to and from one another independently of said system of levers, substantially as set forth.

4. In a crimping-machine, the combination, with the crimping-jaws, the crimping form or tree, and the driving mechanism, of the stop mechanism, whereby the motion of the working parts is automatically arrested at a time when the jaws are above and out of contact with the form, substantially as and for the purposes set forth.

5. The combination, in a crimping-machine, of the sliding cross-head, which carries the crimping-jaws, with the tripping-rod, clutch, and system of gearing for transmitting motion to said cross-head under the arrangement, substantially as described, whereby the movement of the cross-head may be reversed or arrested at pleasure, as set forth.

6. The combination of the reversing gears and clutch, by which motion is communicated to the sliding cross-head with the large and small gear-wheels which impart movement to said reversing-gears, substantially as described, so that the cross-head shall be caused to ascend more rapidly than it descends, for the purposes stated.

7. The crimping-jaws arranged to move upon two axes, the one horizontal the other vertical, substantially in the manner set forth, so that they may be tilted or rocked endwise to conform to the position of the crimping-form, and may also vibrate upon a vertical axis to allow for inequalities in the material to be crimped.

8. The combination, with the laterally-vibrating jaws, of stops or set-screws to limit the vibration of the jaws and to hold them in close contact with any portion of the leather to be crimped, substantially in the manner as shown and set forth.

9. The combination of the crimping jaws, the set-screws, and slotted-plate by which it is supported, and the socketed plate and spindle by which said slotted-plate is held in position, substantially as shown and set forth.

10. The combination, with the crimping-jaws, of the double-helical cam-disks, the brackets provided with corresponding cams, and the set-screws or spindles and nuts for maintaining said parts in position under the arrangement, substantially as described, so that the jaws may be set and held at a greater or less distance apart to conform to the thickness of the material to be crimped.

11. In a crimping-machine, an adjustable form or tree arranged so that the toe can be more or less elevated, in order to crimp at various angles, according to the shape of the leather or other material operated on.

12. The combination, with the adjustable tree or form of crimping-jaws oscillating in a plane parallel with the tree, so that said jaws may be adjusted to conform to whatever position the tree may occupy, as set forth.

13. The adjustable tree or form, arranged so that it shall move in the arc of a circle, of which the pivot or point of oscillation of the crimping-jaws is the center, substantially as set forth.

14. In a crimping-machine the combination, with crimping jaws or plates, of a laterally-adjustable crimping form or tree, substantially as set forth.

15. The combination, with the tree or crimping-form of laterally self-adjusting brackets for supporting the same, substantially as described, so as to equalize or distribute evenly the pressure of the jaws upon the leather on both sides of the form.

16. The combination, with the crimping-jaw of the sliding-clamp or corner-stretcher and lever and cam for operating the same, substantially as set forth.

17. The combination, with the hinged ways of a system of levers operated by a treadle or otherwise to spread said ways, so as to relieve the pressure and strain of the jaws on the leather or form whenever necessary, substantially as shown and set forth.

18. The combination, with the hinged ways, of the set-screws and pointers or gages for limiting the movement and determining the parallelism of the ways, substantially as set forth.

In testimony whereof I have hereunto signed my name this 10th day of June, A. D. 1875.

S. W. JAMISON.

Witnesses:

B. F. STONE,

A. J. ROBINSON.